US008246885B2

(12) United States Patent
Jeannot et al.

(10) Patent No.: US 8,246,885 B2
(45) Date of Patent: Aug. 21, 2012

(54) METHOD AND ASSEMBLY FOR THE MANUFACTURE OF AN ABSORBENT SHEET, AND ABSORBENT SHEET OBTAINED

(75) Inventors: Sebastien Jeannot, Holtzwihr (FR); Pierre Graff, Wolfgantzen (FR); Benoit Hoeft, Bischwihr (FR); Pierre Probst, Ammerschwihr (FR)

(73) Assignee: Georgia-Pacific France (FR)

( * ) Notice: Subject to any disclaimer, the term of this patent is extended or adjusted under 35 U.S.C. 154(b) by 0 days.

(21) Appl. No.: 13/197,196

(22) Filed: Aug. 3, 2011

(65) Prior Publication Data

US 2011/0290423 A1 Dec. 1, 2011

Related U.S. Application Data

(62) Division of application No. 12/443,204, filed as application No. PCT/FR2007/001538 on Sep. 21, 2007, now Pat. No. 8,012,311.

(30) Foreign Application Priority Data

Sep. 27, 2006 (FR) ..................................... 06 08489

(51) Int. Cl.
*B29C 49/00* (2006.01)

(52) U.S. Cl. ........ 264/284; 264/119; 264/517; 428/343; 156/60; 156/209; 156/219; 162/205; 162/362

(58) Field of Classification Search .................. 264/284, 264/119, 517; 428/343, 172, 152–156; 156/60, 156/209, 459, 470; 427/208.2, 277; 162/205
See application file for complete search history.

(56) References Cited

U.S. PATENT DOCUMENTS

| | | | | |
|---|---|---|---|---|
| 3,377,224 A | | 4/1968 | Gresham et al. | |
| 3,547,723 A | * | 12/1970 | Gresham | 156/209 |
| 3,556,907 A | * | 1/1971 | Nystrand | 156/470 |
| 3,867,225 A | * | 2/1975 | Nystrand | 156/209 |
| 6,572,722 B1 | * | 6/2003 | Pratt | 156/209 |
| 6,824,647 B2 | | 11/2004 | Neveu et al. | |

(Continued)

FOREIGN PATENT DOCUMENTS

EP 1362953 B1 5/2005

(Continued)

OTHER PUBLICATIONS

Technologie professionnelle générale pour les mécaniciens—Tome II—Classe de 1ère—Editions Foucher, pp. 35 to 38.

(Continued)

*Primary Examiner* — Mark Halpern
(74) *Attorney, Agent, or Firm* — Laura L. Bozek

(57) ABSTRACT

The invention relates to a process for manufacturing an absorbent sheet comprising at least two plies of cellulose wadding, consisting in combining said plies under pressure by passing between two steel cylindrical components, the first being smooth on the outside and the second being equipped with raised components on the outside and the hardness of the first cylindrical component being lower than that of the second cylindrical component. According to the invention, the first cylindrical component has a treated hardened surface layer and a deformable underlayer; the second cylindrical component has a hardened outer surface, and the sheet, when it passes between the two cylindrical components is compressed at a specific pressure between 40 and 250 N/mm$^2$. Another subject of the invention is an assembly of steel cylindrical components intended for the manufacture of multiply absorbent sheets.

18 Claims, 3 Drawing Sheets

U.S. PATENT DOCUMENTS

| | | | |
|---|---|---|---|
| 2003/0031812 | A1 | 2/2003 | Bertoncini et al. |
| 2007/0051464 | A1 | 3/2007 | Bertoncini et al. |

FOREIGN PATENT DOCUMENTS

| | | | |
|---|---|---|---|
| FR | 1443728 | A | 6/1966 |
| FR | 2801833 | A1 | 6/2001 |
| WO | 98/47706 | A1 | 10/1998 |
| WO | 01/38078 | A1 | 5/2001 |
| WO | 2004/065113 | A1 | 8/2004 |

OTHER PUBLICATIONS

ISO standard 6508-1: 1999.

International Search Report for PCT/FR2007/001538 dated Apr. 16, 2008.

Written Opinion of the International Searching Authority for PCT/FR2007/001538 dated Apr. 16, 2008.

* cited by examiner

METHOD AND ASSEMBLY FOR THE MANUFACTURE OF AN ABSORBENT SHEET, AND ABSORBENT SHEET OBTAINED

CLAIM FOR PRIORITY

This application is a division of prior U.S. patent application Ser. No. 12/443,204, filed Mar. 27, 2009, which is a National Stage entry of International Application No. PCT/FR2007/001538, filed Sep. 21, 2007, which claims priority to French Patent Application No. 06 08489, filed on Sep. 27, 2006, the priorities of which are hereby claimed and their disclosures incorporated by reference in their entirety.

BACKGROUND OF THE INVENTION

The present invention relates to the field of absorbent papers based on cellulose wadding, for sanitary or domestic use such as bathroom tissue, paper towels or other wiping paper, paper napkins, etc.

To produce such products, cellulose wadding also called tissue paper is usually used. It is an absorbent paper of low basis weight, lying between 10 and 45 g/m$^2$, obtained by the wet method from paper fibers. It comprises, where appropriate, chemical additives in small proportions, depending on the use for which it is intended. It may be obtained by pressing the still-wet sheet on a large-diameter, heated cylindrical element, on which it is dried and from which it is subsequently detached by means of a metal blade applied against the latter, across its direction of rotation. The purpose of this operation is to crepe the sheet which then has undulations across its direction of travel. The creping confers a certain elasticity on the sheet at the same time as it increases the thickness thereof and gives it touch properties.

Another known manufacturing method comprises a first step of drying the sheet, at least partly, by means of a current of hot air passing through it. The latter may or may not then be creped.

Usually, the sheet thus manufactured is then transformed in another distinct manufacturing phase, called transformation or converting, and combined with other sheets then called plies to form the end product of absorbent paper.

Specifically, when the requirement is to confer particular properties on a sheet such as thickness, softness, bulk, it is possible to choose to combine several plies together.

The combining operation may be of a chemical nature by adhesive bonding for example or else of a mechanical nature.

Concerning adhesive bonding, the known methods consist in depositing a film of adhesive over some or all of the surface of one of the plies, then placing the adhesive-treated surface in contact with the surface of at least one other ply.

This type of combining operation requires specific additional equipment in the production line which represents a cost and added technical difficulties. In addition, the adhesive is expensive in itself, soils the cylindrical elements of the embossing unit and may cause an added rigidity that is undesirable on the end product whose softness will be further diminished by the presence of the adhesive. These disadvantages have caused certain manufacturers to turn towards mechanical-type combining operations.

In this case, the plies may be combined by knurling or by compression in a transformation or converting phase.

Knurling consists in compressing the plies to be combined between a knurling wheel (or engraved wheel provided with elements in relief) and a smooth cylindrical element.

Each knurled strip therefore corresponds to the width of a knurling wheel. The strips may form decorative strips on the sheet.

As an illustration, U.S. Pat. No. 3,377,224 describes a tissue paper made by such a method. Given that a very limited width of paper is knurled, a notable disadvantage lies in the delamination of the zones that are not knurled.

In addition, combining by knurling is limited when it is required to produce patterns over the whole width. Specifically, even if a large number of knurling wheels are placed side by side (thus creating a large number of strips), there may still remain zones that are not knurled.

Document EP 1 362 953 illustrates a particular example of an installation and a method using knurling. The major difference compared with the basic method described hereinabove lies in that the plies are combined along wide parallel strips (direction of travel of the machine) on the sheet, and in that a film of additive such as oil is applied to at least one of the faces of the sheet.

Furthermore, knurling generally creates problems of visibility of the embossed pattern if there is one, because the knurling flattens the embossed patterns.

In addition, in the case where a large number of knurling wheels is used, the adjustment and/or setting of the knurling wheels makes manufacture difficult and complex.

Embossing is also known that is a deformation in the thickness of the sheet or of the ply, which confers thereon a particular relief or indentation. The thickness of the sheet or of the ply is increased after embossing compared with its initial thickness.

Although embossing adds a thickness to each ply or sheet, it nevertheless induces a substantial reduction in the sheet's resistance to tearing. Specifically, the mechanical work on the ply (or the sheet) is accompanied by a loosening of the interfibre links of the embossed zones.

In the case of a multi-ply sheet, the embossing may be carried out individually on each ply and then the already embossed plies may be combined thanks to a marrying cylinder. Application WO 2004/065113 illustrates an example of this type of combining operation.

However, such a marrying cylinder is complex to produce especially when all its external surface must be covered with a strip of hard material rolled in a helix.

In one or other method of producing a multi-ply sheet, the two (or even more) plies are embossed and then combined by passing the sheet thus treated and formed between an engraved cylinder and a marrying cylinder.

The combining operation may pose problems particularly of wear of the engraved cylinder and/or of the marrying cylinder.

The wear is accentuated when high pressures and/or speeds are necessary.

A first known approach consists in covering the external surface of the marrying cylinder for example with a shell.

Application FR 2 801 833 discloses a marrying cylinder (for example) onto which a sleeve is mounted, a layer called an attachment layer being interposed between the cylinder and the sleeve. The attachment layer may be considered to be an "elastic" sub-layer that absorbs the pressure variations and also the manufacturing differences of each of the cylinders.

However, in use, it was revealed that the manufacturing differences and the pressure variations absorbed by this type of cylinder are insufficient. Premature and intermittent wear appeared, particularly if the cylinders operate at high speeds, from approximately 300 m/min.

In addition, the pressure on the sheet at the passage (or nip) between the cylinders accentuates the wear thereof; the external layer is damaged in places.

Naturally, all these deficiencies have negative consequences on the sheets formed which, for example, are not sufficiently combined (they delaminate); the result therefore is a production of uneven, or even generally bad, quality.

This is acceptable neither for the manufacturer nor for the user.

There is therefore a need to combine plies made of tissue paper in a manner that is reliable, simple, without bonding and that obviates the problems specified hereinabove.

SUMMARY OF THE INVENTION

The present invention proposes a solution whose subject is a method of manufacturing an absorbent sheet comprising at least two plies of tissue paper, consisting in combining the said plies under pressure by passing them between two cylindrical steel elements, the first being externally smooth and the second being externally provided with elements in relief and the hardness of the first cylindrical element being less than that of the second cylindrical element.

According to the invention, the first cylindrical element has a treated, hardened superficial layer and a deformable sub-layer; the second cylindrical element has a hardened outer surface, and the sheet, as it passes between the two cylindrical elements, is compressed at a specific pressure lying between 40 and 250 N/mm$^2$.

The features specified hereinabove advantageously make it possible to work at high pressures and therefore obtain multi-ply products of good quality which also have several, varied and perfectly visible embossing patterns.

Advantageously, the difference in external hardness between the first and the second cylindrical element lies between 2 and 20 HRC, preferably between 5 and 15 HRC.

This difference in hardness makes it possible to operate at high speeds and/or pressures while obtaining a perfect combination of plies.

In addition, this difference in hardness creates wear of the engraved cylindrical element that is less rapid than that of the first cylindrical element, which is an advantage because the engraved cylindrical element is a costly element of the installation, more costly than the first, smooth, cylindrical element.

Concerning the external hardness of the first cylindrical element, it is possible to choose values lying between approximately 30 and approximately 65 HRC.

The method according to the invention advantageously makes it possible to combine plies of a width lying between 0.3 and 4 m, without a problem of wear of the cylindrical elements or of variation in the quality of the combining, irrespective of the speeds at which the plies pass through.

The sheet obtained by such a method is also a subject of the invention.

An additional subject of the invention is a set of steel cylindrical elements designed for combining multi-ply absorbent sheets, the first cylindrical element being externally smooth and the second cylindrical element being externally provided with elements in relief, the external hardness of the first cylindrical element being less than that of the second cylindrical element, and the said set making it possible to combine the various plies of the sheet under pressure by passing them into the gap between their generatrices.

According to the invention, the first cylindrical element has a hardened superficial layer and a deformable sub-layer and the second cylindrical element has a hardened external surface, the first cylindrical element being pressed against the second cylindrical element so as to apply to the absorbent sheet a specific pressure lying between 40 and 250 N/mm$^2$.

In addition to the advantages already cited, the invention allows great flexibility in the choice of marking patterns, in the type of embossing, the placing and/or the quantity of the patterns.

Furthermore, the first cylindrical element may comprise one cylinder, or else a set of several coaxial cylinders.

According to a worthwhile feature of the invention, the external (superficial) layer of the first cylindrical element has a thickness lying between 3 and 30 mm, while the thinner, deformable sub-layer may have a thickness lying between 0.5 and 10 mm.

A hardness gradient of the said external layer of the first cylindrical element may advantageously be provided according to its thickness.

Without departing from the context of the invention, the said external superficial layer of the first cylindrical element may comprise two layers that are combined with and superposed on one another, the outermost being treated, hardened.

The external surface (or shell) of the first cylindrical element, mounted on the deformable sub-layer, forms a sort of shield which perfectly resists the mechanical actions while generally retaining a certain flexibility in the cylindrical element.

Therefore, for large dimension widths, the deflection at the centre of the cylindrical element may be compensated for by the general relative flexibility of the said cylindrical element.

Similarly, the manufacturing tolerances of each of the cylindrical elements may be compensated for particularly but not exclusively by the said flexibility created by the deformable sub-layer.

It can also be envisaged, without departing from the context of the invention, that the said deformable sub-layer comprises at least two layers having different mechanical characteristics.

BRIEF DESCRIPTION OF THE DRAWINGS

Other features, details and advantages of the present invention will better emerge on reading the following description, given by way of illustration and in no way limiting, with reference to the appended drawings in which.

DETAILED DESCRIPTION

Figure 1:
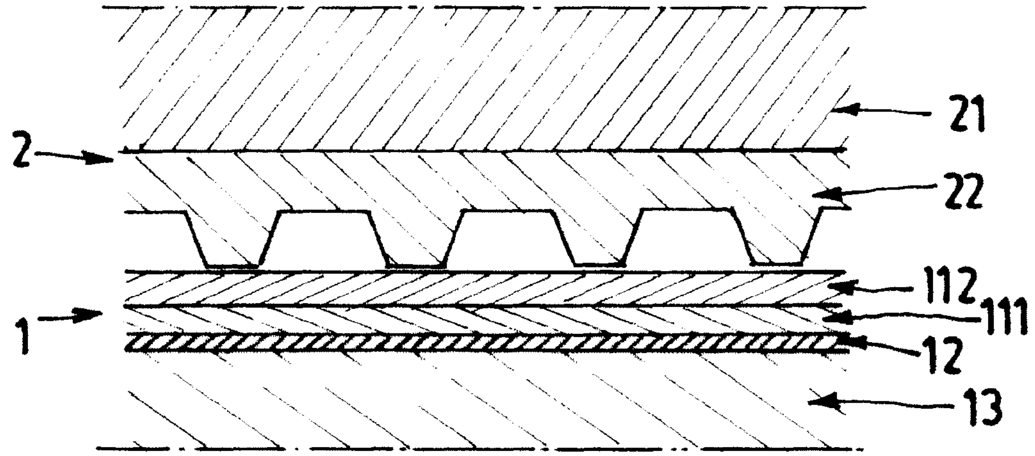
FIG. 1 is a simplified section of a "nip" between two cylindrical elements, according to a first embodiment of the invention.

According to one embodiment of the invention, as schematized in FIG. 1, the set of two cylindrical elements allowing the combination of the plies comprises a first cylindrical element 1 normally called the marrying cylindrical element which interacts with a second cylindrical element 2 called the embossing cylindrical element.

As is known, the marrying cylindrical element 1 has a smooth external surface, and the embossing cylindrical element 2 has external protuberances such as lines, protrusions, having only one or else two or even more different depths.

As is equally known, the first marrying cylindrical element has an external hardness that is less hard than that of the second cylindrical element.

According to one embodiment as illustrated in FIG. 1, the first cylindrical element 1 has an external surface formed of two layers 111, 112 that are combined with and superposed on one another, the outermost 112 being treated, hardened.

Figure 2:
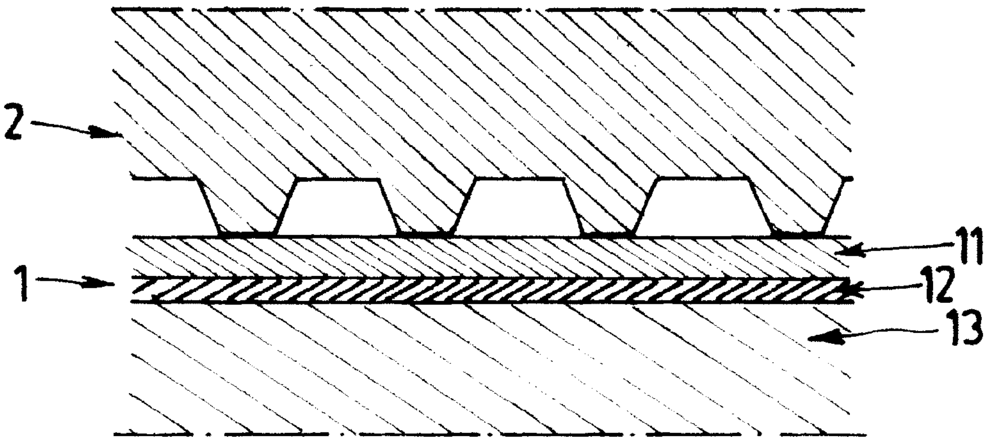
FIG. 2 is a simplified section of a "nip" according to a second embodiment of the invention.

According to another embodiment of the invention, as illustrated in FIG. 2, the first marrying cylindrical element has a hardened external surface 11 that rests on a deformable sub-layer 12 that itself may be for example made of a polymer.

Without departing from the context of the invention, the said sub-layer 12 may comprise at least two layers having different mechanical characteristics, in particular different hardnesses and/or resiliences.

The external hardness of the first cylindrical element may be produced thanks to a treated steel sleeve; or else thanks to a sleeve externally faced with a hardened treated layer.

Any conventional treatment known to those skilled in the art may here be used in order to confer the required external hardness on the said cylindrical element 1.

In all cases, the aim is to obtain an external (surface) hardness greater than approximately 30 HRC, preferably lying between 30 and 55 HRC.

Furthermore, the external surface of the engraved cylindrical element 2 has a hardness that is 2 to 20 HRC greater than that of the first marrying cylindrical element 1. A difference in hardness lying between 5 and 15 HRC may be preferred.

The HRC unit is a unit of hardness according to the test developed by the company Rockwell based on the following principle:

A pointed body is inserted into a metal test piece.

More precisely, the penetrating body used is a slightly rounded diamond point whose angle at the vertex is 120°; this diamond point is sunk progressively into the metal and the remanent penetration (e, in μm) of the point is measured under a given load.

The hardness value is then given by $$100 - \frac{e}{2}$$

So, the harder the metal, the closer its hardness expressed in HRC units is to 100.

These hardness tests known to those skilled in the art are for example disclosed in the work "Technologie professionnelle générale pour les mécaniciens"—Tome II—Classe de $1^{ère}$—Editions Foucher, pages 35 to 38.

In addition, ISO standard 6508—1:1999 has a complete definition of the Rockwell hardness tests.

The external hardness of the engraved cylindrical element 2 may be achieved by a surface treatment that preferably concerns a thickness 22 greater than the height of the protuberances (or of the highest protuberances) forming the engraving.

It may also be envisaged that the steel of the engraved cylindrical element 2 intrinsically has the required hardness, in its entirety, as illustrated in FIG. 2.

One or the other solution will be chosen according to the cost and/or the difficulty of producing the cylindrical elements 1, 2, or any other technical constraint.

According to the invention, at the nip between the cylindrical elements 1 and 2, there is contact along the common generatrix of the cylindrical elements and the absorbent sheet to be combined passes between these cylindrical elements where it sustains a particular specific pressure, lying between 40 and 250 N/mm$^2$.

The specific pressure may be defined as the ratio of the total force applied by the first cylindrical element 1 on the second cylindrical element 2 at the nip, to the sum of the surface areas in contact at this location, at a given moment.

It is easily understood therefore that this pressure varies according to the geometry of the distal (end) surfaces of the protuberances of the engraved cylindrical element 2, and that it may thus be mastered, controlled.

The present invention advantageously allows great freedom in the choice of protuberances, that is to say specifically of the embossing patterns of the absorbent sheet to be manufactured.

It can even be envisaged to produce the embossing thanks to one type of protuberance and the combining operation thanks to another type of protuberance, those that are effectively in contact under pressure with the external surface of the marrying cylindrical element 1.

Great flexibility in the choice is possible according to the invention.

Furthermore, the features mentioned hereinabove allow a combining operation on sheets of relatively great width, that is to say lying between 0.3 and 4 m, with no particular problem.

Concerning the nature of the deformable sub-layer 12, the latter may be made of a compressible polymer such as for example an elastomer.

This sub-layer may have a thickness lying between 0.5 and 10 mm; tests with thicknesses from 2 to 4 mm have given very worthwhile results.

The arrangement according to the invention makes it possible to reduce the deflection in the embossing cylindrical element 2 and the vibrations and other associated disadvantages.

As a produced example, the marrying cylindrical element 1 is faced with a sleeve 11 which has a hardness of 47 HRC and is in contact with the engraved cylindrical element 2 which itself has an external hardness of 57 HRC. The elastic sub-layer 12 has a thickness of 4 mm and is made of a compressible polymer such as an elastomer known per se.

The sub-layer 12 advantageously makes it possible to absorb the manufacturing defects, the wear and/or the vibrations at high speeds.

"High speeds" should be understood to be speeds equal to or greater than approximately 300 m/min for manufactures of bathroom tissue; and of 150 to 350 m/min for manufactures of facial tissues.

It has also been observed that a difference in hardness of approximately 10 HRC between the external surfaces of the two cylindrical elements 1, 2 makes it possible to obviate all the aforementioned disadvantages, and especially to preserve relatively low wear of each of the cylindrical elements with account being taken of their rotation speeds and their respective dimensions.

Figure 3:
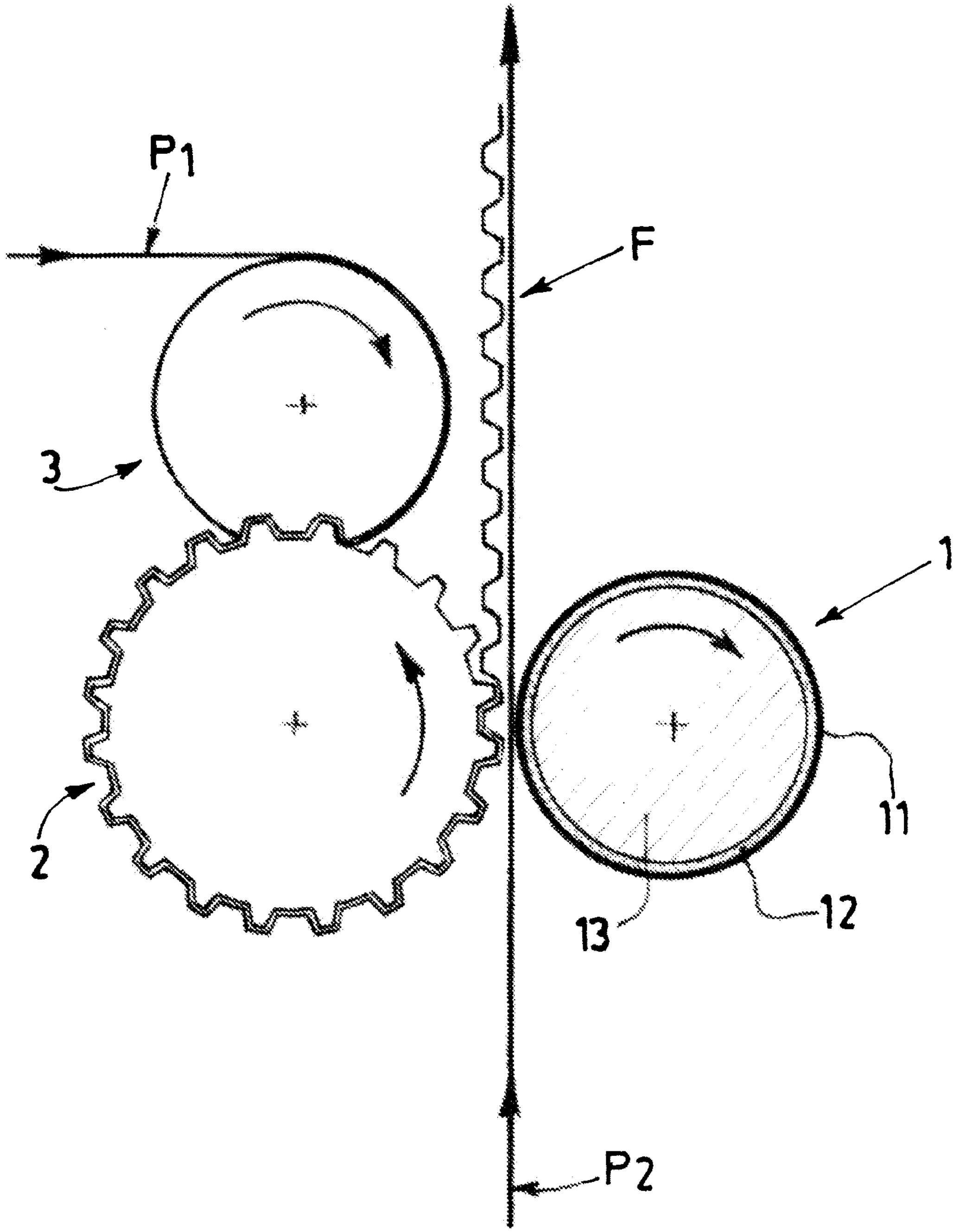
FIG. 3 is a diagram showing the main elements necessary for applying one embodiment of the invention.
Figure 4:
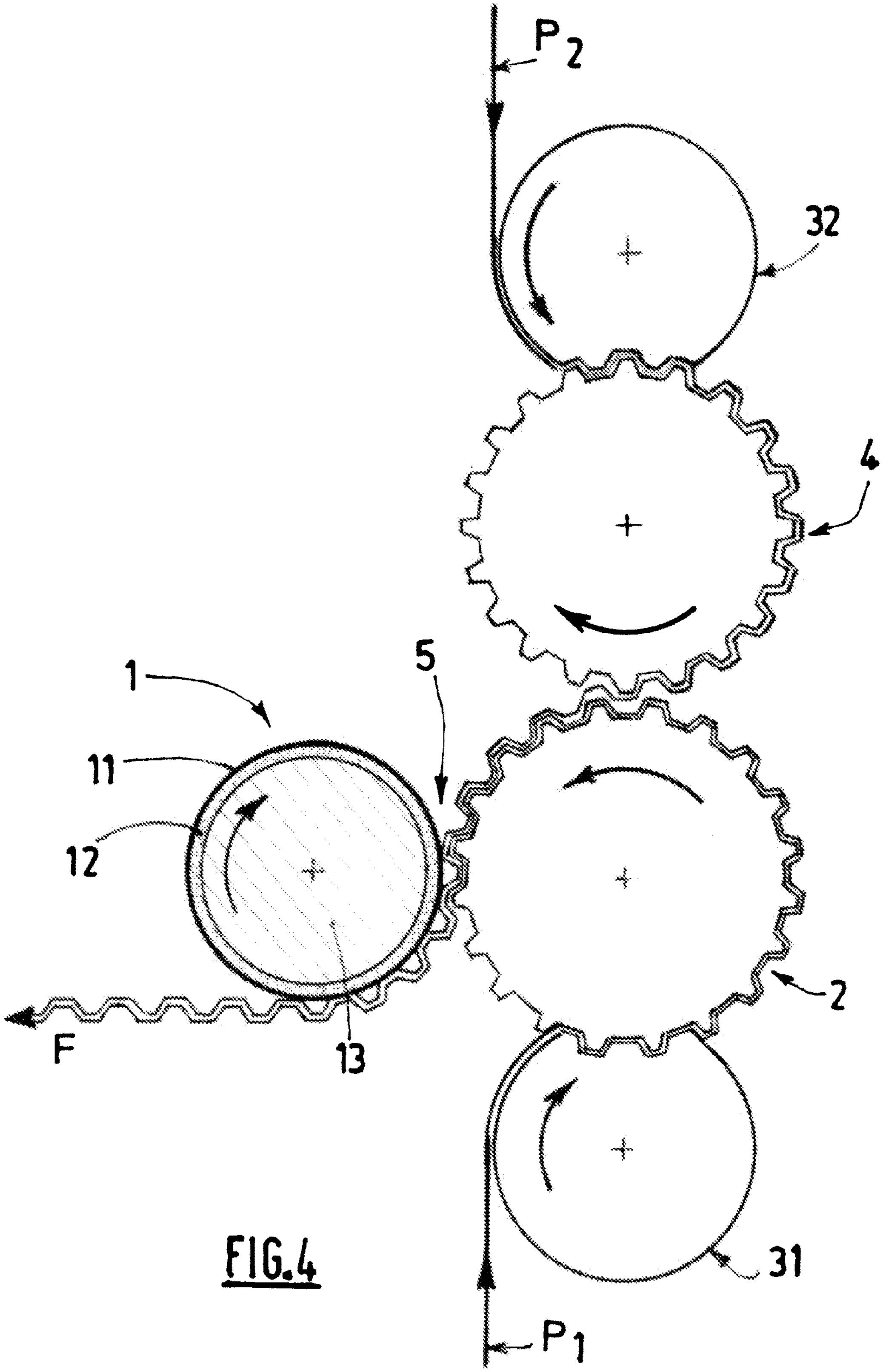
FIG. 4 is a diagram showing the main elements necessary for applying another embodiment of the invention.

For the purposes of illustrating a method of manufacturing a sheet according to the invention, FIGS. 3 and 4 schematize two examples of envisageable installations.

FIG. 3 shows a first example according to which the elements used comprise, in addition to the marrying cylindrical element 1 and the engraved (embossing) cylindrical element 2, a cylindrical element made of rubber 3 designed to interact with the cylindrical element 2 in order to emboss one of the plies (or groups of plies) P1 forming the sheet F, according to an operating mode known per se and which, as a result, will not be explained further.

In the example illustrated by FIG. 3, a second ply (or group of plies) P2 is brought into the gap (or nip) between the cylindrical elements 1 and 2 where it is combined with the first ply P1, as already described. This second ply is not embossed.

A sheet F comprising two plies P1, P2 (or group of plies) is thus produced, with a first embossed ply and a second unembossed ply.

FIG. 4 shows the elements used to manufacture an absorbent sheet according to another embodiment of the invention and which comprise, in addition to a marrying cylindrical element 1 and an engraved cylindrical element 2, a second engraved cylindrical element 4 and two rubber cylindrical elements 31, 32 that form counterparts to each of the engraved cylindrical elements 2, 4.

Thus the first ply (or group of plies) P1 first passes between the first rubber cylindrical element 31 and the engraved cylindrical element 2 where it is embossed. Simultaneously and symmetrically, the second ply P2 passes between the second rubber cylindrical element (counterpart) 32 and the second engraved cylindrical element 4 for the purposes of embossing.

The two plies (or group of plies) thus embossed separately come together between the first and second engraved cylindrical elements 2, 4 that are set so that the protuberances (or markings) of each of the plies are nested in one another. This particular arrangement, called nested, is well known to those skilled in the art and will not be described further.

Thus positioned relative to one another, the plies are then combined at the nip 5 between the first engraved cylindrical element 2 and the marrying cylindrical element 1 in conditions mentioned above complying with the invention.

Without departing from the context of the invention, the first, smooth, cylindrical element 1 may comprise a set of coaxial cylinders supported by one or more shafts. In the latter case, the shafts are offset angularly about the second engraved cylindrical element 2. In principle two shafts are preferably provided, diametrically opposed.

Naturally, each of the coaxial cylinders has features according to the invention, namely in particular a treated, hardened superficial layer 11 and a deformable sub-layer 12.

Without departing from the context of the invention, it is envisageable to combine at least two plies without the latter first being treated and/or embossed.

The invention claimed is:

1. A set of steel cylindrical elements designed for combining multi-ply absorbent sheets, the first cylindrical element being externally smooth and the second cylindrical element being externally provided with elements in relief, the external hardness of the first cylindrical element being less than that of the second cylindrical element, and the said set making it possible to combine the various plies of the sheets under pressure by passing them into the gap between their generatrices, the second cylindrical element having a hardened external surface, the first cylindrical element being pressed against the second cylindrical element so as to apply to the absorbent sheet a specific pressure lying between 40 and 250 N/mm2;

wherein the first cylindrical element has a hardened superficial layer mounted on a deformable sub-layer so as to form a shield; and wherein a difference in external hardness between the first and the second cylindrical element lies between 2 and 20 HRC.

2. The set of cylindrical elements according to claim 1, characterized in that the first cylindrical element is a cylinder.

3. The set of cylindrical elements according to claim 2, characterized in that the first cylindrical element comprises several coaxial cylinders.

4. The set of cylindrical elements according to claim 2, characterized in that the external hardness of the first cylindrical element lies between approximately 30 and approximately 65 HRC.

5. The set of cylindrical elements according to claim 2, characterized in that the external layer of the first cylindrical element has a thickness lying between 3 and 30 mm.

6. The set of cylindrical elements according to claim 2, characterized in that the deformable sub-layer of the first cylindrical element has a thickness lying between 0.5 and 10 mm.

7. The set of cylindrical elements according to claim 2, characterized in that the external superficial layer of the first cylindrical element has a hardness gradient according to its thickness.

8. The set of cylindrical elements according to claim 2, characterized in that the external superficial layer of the first cylindrical element comprises two layers and combined with and superposed on one another, the outermost being treated, hardened.

9. The set of cylindrical elements according to claim 2, characterized in that the deformable sub-layer comprises at least two layers having different mechanical characteristics.

10. The set of cylindrical elements according to claim 1, characterized in that the first cylindrical element comprises several coaxial cylinders.

11. The set of cylindrical elements according to claim 10, characterized in that the external hardness of the first cylindrical element lies between approximately 30 and approximately 65 HRC.

12. The set of cylindrical elements according to claim 10, characterized in that the external layer of the first cylindrical element has a thickness lying between 3 and 30 mm.

13. The set of cylindrical elements according to claim 10, characterized in that the deformable sub-layer of the first cylindrical element has a thickness lying between 0.5 and 10 mm.

14. The set of cylindrical elements according to claim 10, characterized in that the external superficial layer of the first cylindrical element has a hardness gradient according to its thickness.

15. The set of cylindrical elements according to claim 10, characterized in that the external superficial layer of the first cylindrical element comprises two layers and combined with and superposed on one another, the outermost being treated, hardened.

16. The set of cylindrical elements according to claim 10, characterized in that the deformable sub-layer comprises at least two layers having different mechanical characteristics.

17. The set of steel cylindrical elements according to claim 1, wherein the deformable sub-layer is made of a compressible polymer.

18. The set of steel cylindrical elements according to claim 17, wherein the deformable sub-layer is made of an elastomer.

* * * * *